United States Patent
Seki et al.

(10) Patent No.: US 8,795,750 B2
(45) Date of Patent: Aug. 5, 2014

(54) METHOD FOR MANUFACTURING LOW-PHOSPHORUS WHEY

(75) Inventors: Nobuo Seki, Zama (JP); Masatoshi Ohnishi, Tokyo (JP); Kie Kinoshita, Zama (JP); Yoshitaka Tamura, Tokyo (JP); Hitoshi Saito, Zama (JP); Hiroshi Ochi, Zama (JP); Takafumi Kimura, Zama (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 0 days.

(21) Appl. No.: 13/497,646

(22) PCT Filed: Sep. 24, 2010

(86) PCT No.: PCT/JP2010/066482
§ 371 (c)(1),
(2), (4) Date: Mar. 22, 2012

(87) PCT Pub. No.: WO2011/037155
PCT Pub. Date: Mar. 31, 2011

(65) Prior Publication Data
US 2012/0263839 A1 Oct. 18, 2012

(30) Foreign Application Priority Data
Sep. 25, 2009 (JP) ................................. 2009-220086

(51) Int. Cl.
| A23C 9/14 | (2006.01) |
| A23C 9/142 | (2006.01) |
| A23C 9/146 | (2006.01) |
| A23J 3/08 | (2006.01) |
| A23L 1/29 | (2006.01) |

(52) U.S. Cl.
CPC ............... *A23C 9/1425* (2013.01); *A23C 9/146* (2013.01); *A23J 3/08* (2013.01); *A23L 1/296* (2013.01)
USPC ............................. 426/271; 426/583; 127/46

(58) Field of Classification Search
CPC ......... A23C 9/1425; A23C 9/146; A23J 3/08; A23L 1/296; A23V 2002/00
USPC ........................................................ 426/271
See application file for complete search history.

(56) References Cited

U.S. PATENT DOCUMENTS

| 5,744,179 | A | 4/1998 | Shimamura et al. |
| 2004/0022922 | A1* | 2/2004 | Rutenberg .................... 426/601 |
| 2008/0193623 | A1* | 8/2008 | Guerra-Gonzalez et al. . 426/583 |

FOREIGN PATENT DOCUMENTS

| FR | 2848877 A1 | 6/2004 |
| JP | 58175438 A | 10/1983 |

(Continued)

OTHER PUBLICATIONS

Bonte: Pub. No. WO/2009/113861; Publication Date: Sep. 17, 2009; International Application No. PCT/NL2009/050124; International Filing Date: Mar. 13, 2009.*

(Continued)

*Primary Examiner* — Patricia George
(74) *Attorney, Agent, or Firm* — Wood, Herron & Evans, LLP (57) ABSTRACT

A method of manufacturing a low-phosphorus whey, the method including subjecting a raw whey liquid to a demineralization treatment using a nanofiltration method to obtain a low-chloride whey liquid in which the chloride content has been reduced to not more than 30 mmol per 100 g of solids, and passing the low-chloride whey liquid through an ion exchange resin to obtain an ion-exchanged whey liquid having a reduced phosphorus content, wherein the ion exchange resin is composed of an anion exchange resin, and at least an anion exchange resin in chloride form is used as the anion exchange resin. The method of manufacturing a low-phosphorus whey can reduce the phosphorus content within the whey while suppressing reduction in the calcium and magnesium content.

7 Claims, 1 Drawing Sheet

(56) References Cited

FOREIGN PATENT DOCUMENTS

| | | | |
|---|---|---|---|
| JP | 60256342 | A | 12/1985 |
| JP | 3295696 | A | 12/1991 |
| JP | 3295696 | B | 12/1991 |
| JP | 2000350551 | A | 12/2000 |
| JP | 2001275562 | A | 10/2001 |
| JP | 3295696 | B | 6/2002 |
| JP | 3411035 | B | 5/2003 |
| JP | 3411035 | B2 | 5/2003 |
| RU | 2192751 | C2 | 11/2002 |
| WO | 9413149 | A1 | 6/1994 |
| WO | 2009113861 | A2 | 9/2009 |

OTHER PUBLICATIONS

International Search Report issued in International Application No. PCT/JP2010/066482, mailed Nov. 9, 2010, 4 pages.

Milk Comprehensive Dictionary [Miruku Sogo Jiten], published by Asakura Publishing Co., Ltd., First edition, Jan. 20, 1992, pp. 375 to 377.

Australian Patent Office, Office Action issued in Australian Patent Application No. 2010299077, mailed Sep. 6, 2013, 4 pp.

Bylund, G. Dairy processing handbook (1995). Lund, Sweden: Tetra Pak Processing Systems AB, pp. 331-352. [Retrieved on May 9, 2013].

European Patent Office, extended European Search Report in corresponding European Patent Application No. 10818827.7 dated Mar. 28, 2014 (9 pages).

F. Manz, et al., Special Cow's Milk Formula and Special Whey Protein Concentrate with Low Phosphorus Content for Dietary Treatment in Renal Failure, Akt. Ernähr-Med 18, pp. 38-40 (1993) (3 pages).

Russian Federation, Decision on Grant of Patent for Invention issued in copending Russian Patent Application No. 2012112230 and English language translation (Apr. 9, 2014) (14 pages).

* cited by examiner

METHOD FOR MANUFACTURING LOW-PHOSPHORUS WHEY

TECHNICAL FIELD

The present invention relates to method of manufacturing a low-phosphorus whey having a reduced phosphorus content.

Priority is claimed on Japanese Patent Application No. 2009-220086, filed Sep. 25, 2009, the content of which is incorporated herein by reference.

BACKGROUND ART

Cheese whey is a by-product from the production of cheese. This whey is generally used as a raw material for whey protein or lactose, or used as a raw material for improving the taste of bread or baked sweets, as a raw material for beverages, or as a raw material for infant formula or the like.

However, when whey is used as a raw material for infant formula, because the whey includes large amounts of minerals, there are limitations to the potential applications of the resulting formula.

Generally, in order to achieve a composition similar to human breast milk, infant formula is produced with a protein content of 9.5 to 11 g and a phosphorus content of approximately 6.8 mmol per 100 g of powder. Furthermore, the composition of the protein within the formula is typically set to 40% casein and 60% whey protein in order to achieve a similar composition to human milk.

Many minerals including phosphorus in high purity whey protein isolate or whey protein concentrate are demineralized, and because of their protein content and phosphorus content, have a composition that enables their use in bringing the composition of infant formula closer to that of breast milk.

However, research is still being conducted into trace nutrients derived from human milk that are particularly important for newborn infants, and as far as possible, it is considered desirable to use formulas which, while using cheese whey or other milk-derived raw materials that retain the trace nutrients derived from milk, have undergone removal of components such as phosphorus that can exist in excessive amounts for infants.

For example, provided acid casein (casein: 84%, phosphorus: 23 mmol/100 g) is used as a casein source, then the casein content can be readily controlled, but it is preferable that, as far as possible, skim milk powder (casein: 27.2%, whey protein: 6.8%, phosphorus: 31 mmol/100 g) is used, with whey used, where possible, as the source of the whey protein.

In this case, the whey includes phosphorus in an amount of 18 to 22 mmol/100 g solids, and this phosphorus content must be reduced to not more than 6 to 12 mmol/100 g solids. Accordingly, the development of techniques that enable infant formulas to be brought closer to the composition of human breast milk, while reducing the phosphorus content within the whey, is very important.

One technique for reducing the phosphorus content within a whey is an ion exchange resin method (for example, see Non-Patent Document 1).

Further, known methods for manufacturing low-phosphorus whey include (A) methods that use only an ion exchange resin (for example, see Patent Document 1), (B) methods in which demineralization is first performed using an electrodialysis membrane or nanofiltration (NF) membrane or the like to reduce the demineralization load on the ion exchange resin, and the partially demineralized whey is then passed through a strongly acidic cation exchange resin and a strongly basic anion exchange resin (for example, see Patent Document 2), or (C) methods in which the whey is first passed through a cation exchange resin in hydrogen form and an anion exchange resin in chloride form, and is subsequently subjected to electrodialysis or nanofiltration (for example, see Patent Document 3).

In the method disclosed in Non-Patent Document 1, the whey is first passed through a cation exchange resin that has been regenerated in hydrogen form, thereby substituting the metal cations with hydrogen ions and causing an acidic eluate to be discharged from the exchange resin. Subsequently, this eluate is passed through an anion exchange resin that has been regenerated in hydroxide form, thereby substituting the anions (citrate, phosphate, chloride or lactate) with hydroxide ions to effect demineralization. This method is capable of achieving a high demineralization rate of 90 to 98%.

In the method of manufacturing low-phosphorus whey protein disclosed in Patent Document 1, a whey protein concentrate having a protein content of 70% by mass is diluted, and the pH of the diluted solution is adjusted to 4 or lower. Subsequently, the solution is brought sequentially into contact with a cation exchange resin in $H^+$ form and then an anion exchange resin, thus yielding a low-phosphorus whey protein in which the phosphorus content has been reduced to not more than 0.15 mg per 1 g of protein.

Patent Document 2 relates to a method of concentrating and demineralizing a cheese whey, and in an Example 4 within this document, high-protein substances are removed from a skim acid cheese whey solution by ultrafiltration, and a reverse osmosis membrane having a particularly low salt rejection rate is then used to perform concentration and demineralization simultaneously. Subsequently, the obtained whey concentrate is passed through a strongly acidic cation exchange resin and a strongly basic anion exchange resin of a mixed bed ion exchange apparatus to complete demineralization.

In the method disclosed in Patent Document 3, a concentrated whey is first introduced into a weakly cationic or carboxylic acid column to achieve ion exchange of 60 to 70% of the divalent cations with protons, and ion exchange of 5 to 15% of the monovalent cations with protons. Subsequently, the resulting eluate is introduced into a mixed bed column containing a strong cation exchange resin and a strong anion exchange resin, thereby exchanging the remaining calcium ions and magnesium ions with protons. Moreover, the sodium and potassium ions are also exchanged with protons, and sulfate anions undergo ion exchange with chloride ions, yielding a strongly acidic (pH 2 to 2.5) eluate. This eluate is introduced into an electrodialysis apparatus, and the majority of the chloride anions and the majority of the protons are removed. The resulting product is then passed through a strong anion exchange resin to exchange citrate ions and phosphate ions with chloride ions.

CITATION LIST

Patent Documents

[Patent Document 1]
Japanese Patent (Granted) Publication No. 3,411,035
[Patent Document 2]
Japanese Unexamined Patent Application, First Publication No. Sho 58-175438
[Patent Document 3]
Japanese Patent (Granted) Publication No. 3,295,696

Non-Patent Documents

[Non-Patent Document 1]
Milk Comprehensive Dictionary [Miruku Sogo Jiten], published by Asakura Publishing Co., Ltd., first edition Jan. 20, 1992, pp. 375 to 377.

DISCLOSURE OF INVENTION

Problems to be Solved by the Invention

Calcium and magnesium are important nutrients, the intake levels of which are prescribed in many countries. In Japan, these intake levels are prescribed in "Dietary Reference Intakes for Japanese (2005)". However, in Japan, according to reports such as "Results of National Health and Nutrition Survey 2005", the nutrient adequacy of these dietary reference intakes is inadequate. As a result, calcium- and magnesium-enriched foods and supplements are widely distributed. Calcium and magnesium are specified as nutritional components that may be listed for food with nutrient function claims, and by satisfying certain requirements, foodstuffs may be listed as having calcium or magnesium functions. In this manner, the nutritional importance of calcium and magnesium is widely recognized.

Dairy products offer much promise as high-quality sources of calcium, and whey is no exception, with low-phosphorus whey in which the phosphorus content has been reduced also acting as a good source of calcium.

In other words, low-phosphorus whey, in which the calcium and magnesium originally contained within the raw whey is retained while the phosphorus content is reduced, is preferred.

Furthermore, in those cases where a whey is used as a raw material for an infant formula, it is usually preferable that the sodium and potassium within the whey is reduced, and therefore it is desirable to manufacture a low-phosphorus whey in which the calcium and magnesium originally contained within the raw whey is retained, while the phosphorus, sodium and potassium content is reduced.

However, the methods disclosed in the above Patent Documents 1 to 3 and Non-Patent Document 1 all include a demineralization step using a cation exchange resin, and this removes not only monovalent cations, but also divalent cations such as calcium and magnesium which have a high nutritional value.

For example, in Table II-4.3 in Non-Patent Document 1, the demineralization rate reported for a whey that has been demineralized using an ion exchange resin is 97%, and the composition following demineralization, reported per 100 g of solids, includes a combined calcium and magnesium content of 5.43 mmol/100 g solids, a phosphorus content of 10 mmol/100 g solids, and a combined sodium and potassium content of 1.71 mmol/100 g solids, indicating that the calcium and magnesium have been removed to a large extent.

Further, in the method disclosed in Patent Document 1, the target values per 1 g of protein are not more than 0.227 mg of calcium, not more than 0.057 mg of magnesium and not more than 0.15 mg of phosphorus (the equivalent values calculated relative to the solid content of the whey that contains 12% by mass of protein are a combined calcium and magnesium content of not more than 0.0961 mmol/100 g solids and a phosphorus content of not more than 0.0581 mmol/100 g solids), indicating that there is absolutely no technical thought given to attempting to retain the calcium and magnesium.

The present invention has been developed in light of the above circumstances, and has an object of providing a method of manufacturing a low-phosphorus whey that can reduce the phosphorus content within the whey while suppressing reduction in the calcium and magnesium content.

Further, in a preferred configuration, the present invention has an object of providing a method of manufacturing a low-phosphorus whey that can reduce the phosphorus, sodium and potassium content within the whey while suppressing reduction in the calcium and magnesium content.

Means to solve the Problems

As a result of intensive research aimed at achieving the above objects, the inventors of the present invention discovered that by passing a raw whey liquid having a low chloride content through an ion exchange resin in chloride form, the phosphorus content could be reduced efficiently while suppressing reduction in the calcium and magnesium.

Further, the inventors also discovered that by subjecting the phosphorus content-reduced eluate from the anion exchange resin to a demineralization treatment using a nanofiltration method, the sodium and potassium content could be reduced while suppressing reduction in the calcium and magnesium content, and during that demineralization treatment, if the molar ratio of the chloride content relative to the combined sodium and potassium content (chloride/(sodium+potassium)) within the treatment target liquid supplied to the nano filtration demineralization treatment is high, then the permeability of sodium and potassium in the nanofiltration increases, yielding improved demineralization efficiency.

One aspect of the present invention relates to a method of manufacturing a low-phosphorus whey, the method including a first demineralization step of subjecting a raw whey liquid to a demineralization treatment using a nanofiltration method to obtain a low-chloride whey liquid in which the chloride content has been reduced to not more than 30 mmol per 100 g of solids, and a step of passing the low-chloride whey liquid through an ion exchange resin, wherein the ion exchange resin is composed of an anion exchange resin, and at least an anion exchange resin in chloride form is used as the anion exchange resin.

Another aspect of the present invention relates to the above method of manufacturing a low-phosphorus whey, wherein the pH of the raw whey liquid is within a range from 6 to 7, and the pH of the low-chloride whey liquid and the pH of the eluate from the anion exchange resin are both within a range from 6 to 7.

Yet another aspect of the present invention relates to the above method of manufacturing a low-phosphorus whey, wherein the chloride content of the low-chloride whey liquid is not more than 20 mmol per 100 g of solids.

Yet another aspect of the present invention relates to the above method of manufacturing a low-phosphorus whey, wherein within the low-phosphorus whey, the phosphorus content is not more than 12 mmol per 100 g of solids, and the combined total of the calcium content and the magnesium content is at least 10 mmol per 100 g of solids.

Yet another aspect of the present invention relates to the above method of manufacturing a low-phosphorus whey, wherein the method further includes a second demineralization step of subjecting the eluate from the anion exchange resin to a demineralization treatment using a nanofiltration method.

Yet another aspect of the present invention relates to the above method of manufacturing a low-phosphorus whey, wherein the molar ratio of the chloride content relative to the combined total of the sodium content and the potassium content (chloride/(sodium+potassium)) within the treatment target liquid supplied to the demineralization treatment of the second demineralization step is at least 0.35.

Yet another aspect of the present invention relates to a method of manufacturing a low-phosphorus whey, the method including a step of passing a low-chloride whey liquid, which contains a whey and has a chloride content of not more than 30 mmol per 100 g of solids, through an ion exchange resin, wherein the ion exchange resin is composed of an anion exchange resin, the anion exchange resin includes at least an anion exchange resin in chloride form, the pH of the low-chloride whey liquid is within a range from 6 to 7, and the pH of the eluate from the anion exchange resin is within a range from 6 to 7.

Yet another aspect of the present invention relates to the above method of manufacturing a low-phosphorus whey, wherein the chloride content of the low-chloride whey liquid is not more than 20 mmol per 100 g of solids.

Yet another aspect of the present invention relates to the above method of manufacturing a low-phosphorus whey, wherein within the low-phosphorus whey, the phosphorus content is not more than 12 mmol per 100 g of solids, and the combined total of the calcium content and the magnesium content is at least 10 mmol per 100 g of solids.

Yet another aspect of the present invention relates to the above method of manufacturing a low-phosphorus whey, wherein the method further includes subjecting the eluate from the anion exchange resin to a demineralization treatment using a nanofiltration method.

Yet another aspect of the present invention relates to the above method of manufacturing a low-phosphorus whey, wherein when subjecting the eluate from the anion exchange resin to the demineralization treatment using a nanofiltration method, the molar ratio of the chloride content relative to the combined total of the sodium content and the potassium content (chloride/(sodium+potassium)) within the treatment target liquid supplied to the demineralization treatment is at least 0.35.

Yet another aspect of the present invention relates to a low-phosphorus whey that is ideal for preparing an infant formula.

Effect of the Invention

The present invention enables the manufacture of a low-phosphorus whey in which the phosphorus content within the whey is reduced, while reduction in the calcium and magnesium content is suppressed.

Moreover, by providing the above-mentioned second demineralization step, a low-phosphorus whey can be manufactured in which the phosphorus, sodium and potassium content within the whey is reduced, while reduction in the calcium and magnesium content is suppressed.

EMBODIMENTS FOR CARRYING OUT THE INVENTION

A more detailed description of the present invention is presented below.
<<Raw Whey Liquid>>

In processes for manufacturing cheese, casein, casein sodium or yoghurt or the like using the milk from cows, goats or sheep or the like as a raw material, the residual transparent liquid following removal of the curdled milk fraction is known as whey. The whey used in the present invention may be an untreated whey prepared by simply separating the curdled milk fraction, a treated whey prepared by subjecting the untreated whey to a pretreatment such as skimming and/or deproteinization, or a powdered product obtained by subjecting the untreated whey or pretreated whey to a conventional drying process such as spray drying or freeze drying. Commercially available whey powders may also be used, and whey powders in which the chloride content has been reduced by pretreatment are ideal.

The raw whey liquid may be any liquid containing a whey, and a liquid whey may be simply used as is, or an aqueous solution of a whey powder may be used. If necessary, a concentrate prepared by concentrating a liquid in advance may also be used as the raw whey liquid.

The whey and the raw whey liquid are preferably neutral. Specifically, the pH of the raw whey liquid is preferably within a range from 5.5 to 7.4, and more preferably within a range from 6 to 7.

Provided the pH of the raw whey liquid satisfies the above range, a neutralization need not be performed, and because the subsequent demineralization step using a nanofiltration method and the step of passing the whey liquid through an ion exchange resin can be performed in the neutral region, decomposition or denaturation of the whey protein and acid decomposition or alkali reaction of the sugars can be prevented. Further, there is no danger of a shortening of the life of the nanofiltration membrane, even if a membrane having low alkali resistance is used.

First Embodiment

<<First Demineralization Step>>

The first demineralization step is a step of subjecting the raw whey liquid to a demineralization treatment using a nanofiltration method to obtain a low-chloride whey liquid having a reduced chloride content.

The nanofiltration method is a method that includes a step of separating a treatment target liquid that is supplied to the nanofiltration demineralization treatment into a permeate that has permeated through a nanofiltration membrane and a retentate that does not permeate the membrane.

A nanofiltration (NF) membrane is a membrane positioned in the region between ultrafiltration (UF) membranes and reverse osmosis (RO) membranes, and targets the separation of moieties having molecular mass values from several dozen to a thousand daltons, which is equivalent to a molecular size in the nanometer region. Among minerals, sugars, amino acids and vitamins and the like, those particles having a small molecular mass and a low charge permeate through a nanofiltration membrane.

Although specific examples of nanofiltration membranes include the DL, DK and HL series of membranes manufactured by GE Water Technologies, Inc., the SR-3 series of membranes manufactured by Koch Membrane Systems Inc., the DOW-NF series of membranes manufactured by Dow Chemical Company, and the NTR series of membranes manufactured by Nitto Denko Corporation (all of which are product names), this is not an exhaustive list.

Depending on the intended application of the finally obtained low-phosphorus whey, a suitable nanofiltration membrane may be selected so as to achieve a low-phosphorus whey of the desired composition.

Nanofiltration methods are ideal for performing selective demineralization of monovalent minerals, and because they exhibit a high rejection rate for calcium and magnesium, they can be used for reducing the chloride content within the raw whey while suppressing reduction in the calcium and magnesium content.

In other words, by subjecting the raw whey liquid to a demineralization treatment using a nanofiltration membrane, the chloride ions contained in the raw whey liquid permeate through the nanofiltration membrane and move to the permeate side. In contrast, the divalent mineral cations undergo almost no permeation through the nanofiltration membrane, and are retained within the retentate.

Accordingly, by using a nanofiltration method, a retentate (low-chloride whey liquid) can be obtained in which the chloride content has been reduced, while reduction in the calcium and magnesium content from the raw whey liquid has been suppressed.

In a demineralization treatment by nanofiltration, the pH of the liquid undergoes almost no change. Accordingly, by using a neutral raw whey liquid, a neutral low-chloride whey liquid can be obtained. The pH of the low-chloride whey liquid is preferably within a range from 5.5 to 7.4, and more preferably within a range from 6 to 7.

The nanofiltration apparatus used in the present invention may be selected appropriately from among conventional apparatus.

For example, the apparatus may include a membrane module containing the nanofiltration membrane, a supply pump that feeds the treatment target liquid to the membrane module, a device that extracts the permeate that has permeated through the nanofiltration membrane from the membrane module, and a device that extracts the retentate that has not permeated through the nanofiltration membrane from the membrane module. A batch system apparatus also includes a raw liquid tank that holds the treatment target liquid prior to its supply to the membrane module, and a device that returns the retentate extracted from the membrane module back to the raw liquid tank.

The membrane separation operation may employ a batch concentration system in which the permeate is extracted and the retentate is returned to the raw liquid tank. In addition to the steps of extracting the permeate and returning the retentate to the raw liquid tank, the system may also be provided with a diafiltration step in which a volume of water equivalent to the extracted permeate is added to the raw liquid tank. Further, a continuous system in which the treatment target liquid is supplied continuously to the membrane module, and the retentate and the permeate are each extracted continuously may also be used. A combination of the two systems is also possible.

By employing a batch concentration system, demineralization and concentration can be performed simultaneously. By also performing diafiltration, a higher degree of demineralization can be achieved.

The chloride content of the low-chloride whey liquid obtained in the first demineralization step, namely the liquid that is subsequently passed through the anion exchange resin described below, is typically not more than 30 mmol, preferably not more than 20 mmol, and more preferably not more than 15 mmol, per 100 g of solids. Provided the chloride content within the low-chloride whey liquid is 30 mmol or less, the phosphorus content can be more readily reduced when the low-chloride whey liquid is passed through an anion exchange resin in chloride form. Further, if the chloride content within the low-chloride whey liquid is 20 mmol or less, then the efficiency of the phosphorus content reduction process improves dramatically.

The chloride content within the low-chloride whey liquid can be controlled via the degree of demineralization achieved by the nanofiltration method, and can be further lowered, for example, by lengthening the demineralization treatment time.

In other words, the amount of chloride removal is calculated as (permeate volume)×(chloride concentration within the permeate), and therefore by continuing the demineralization treatment as long as a permeate is being generated and the permeate includes chloride, the chloride content can continue to be reduced.

Although there are no particular limitations on the lower limit for the chloride content, it becomes more and more difficult to reduce the chloride content as the demineralization treatment progresses. Typically, a chloride content of 5 mmol or greater per 100 g of solids is practical.

In the first demineralization step, the demineralization treatment by nanofiltration may be performed two or more times with altered conditions.

Further, in those cases where the whey within the raw whey liquid is a pretreated whey, and the chloride content of the raw whey liquid is already 30 mmol or less per 100 g of solids, the raw whey liquid need not be subjected to the first demineralization step, and can be used without modification as the low-chloride whey liquid for passing through the anion exchange resin. In those cases where the chloride content of the raw whey liquid exceeds 20 mmol but is not more than 30 mmol per 100 g of solids, the raw whey liquid is preferably subjected to the first demineralization step to reduce the chloride content to not more than 20 mmol per 100 g of solids in order to enable the phosphorus content to be reduced more efficiently by ion exchange.

In those cases where the chloride content of the raw whey liquid is not more than 20 mmol per 100 g of solids, the raw whey liquid may either be passed through the anion exchange resin without performing the first demineralization step, or subjected to the first demineralization step to further reduce the chloride content.

<<Passage through Anion Exchange Resin>>

The low-chloride whey liquid, the chloride content of which has been reduced by the first demineralization step, is next passed through an ion exchange resin.

The ion exchange resin in the present invention is composed of an anion exchange resin. In other words, a treatment of passing the whey liquid through a cation exchange resin is not performed.

The anion exchange resin includes at least an anion exchange resin in chloride form.

The passage of the whey liquid through the anion exchange resin is preferably performed under conditions in the neutral region. Specifically, the pH of the low-chloride whey liquid passed through the anion exchange resin and the pH of the eluate (hereinafter referred to as the "ion-exchanged whey") are both preferably within a range from 5.5 to 7.4, and more preferably within a range from 6 to 7.

For this reason, an ion exchange resin in OH form is preferably not used as the anion exchange resin, and the use of only an ion exchange resin in chloride form as the anion exchange resin is preferred. Further, passage of a liquid through an anion exchange resin in OH form tends to make the liquid become alkaline, thereby inhibiting the release of phosphorus and making it difficult to reduce the phosphorus content, and this is another reason that the use of an anion exchange resin in OH form is undesirable.

An anion exchange resin which has been converted to chloride form in advance using a saline solution or hydrochloric acid may be used as the anion exchange resin in chloride form. Specific examples of the anion exchange resin include the products IRA402BL and IRA958 manufactured by Rohm and Haas Company, and PA316 manufactured by Mitsubishi Chemical Corporation (all of which are product names). However, this is not an exhaustive list, and depending on the intended application of the low-phosphorus whey, any anion exchange resin that is ideal for obtaining a low-phosphorus whey of the desired composition may be selected.

By passing the low-chloride whey liquid having a reduced chloride content through an anion exchange resin in chloride form, the phosphorus content of the liquid is reduced. As a result, an ion-exchanged whey liquid having a reduced phosphorus content can be obtained. On the other hand, the content of divalent mineral cations is only reduced very slightly by passage through the anion exchange resin in chloride form.

Accordingly, an ion-exchanged whey liquid can be obtained in which the phosphorus content within the whey has been reduced, while reduction in the calcium and magnesium content has been suppressed.

In order to achieve a preferred phosphorus content for the low-phosphorus whey described below, the phosphorus content within the ion-exchanged whey liquid is preferably not more than 12 mmol, and more preferably not more than 10 mmol, per 100 g of solids.

The conditions for passage of the liquid through the anion exchange resin in chloride form may be set in accordance with the target value for the phosphorus content within the eluate, provided the conditions do not cause lactose crystallization.

In those cases where a liquid containing a whey is passed through an anion exchange resin in chloride form, the smaller the solid content flow volume per unit of exchange capacity of the ion exchange resin, the greater the ion exchange efficiency becomes, and the greater the reduction in the phosphorus content as a result of passage through the resin. In other words, if the volume of the ion exchange resin is termed A (units: L), and the amount of solids within the eluate is termed B (units: kg), then for comparisons conducted using the same resin, the phosphorus content within the eluate decreases as the solid ratio to resin volume represented by B/A decreases. Further, in order to achieve a greater reduction in the phosphorus content within the eluate, the solid concentration of the liquid passed through the resin is preferably lowered, and the flow rate is preferably reduced (slowed).

The solid concentration of the liquid passed through the anion exchange resin in chloride form is, for example, preferably within a range from 4 to 40% by solid concentration, and more preferably from 5 to 20% by solid concentration. If the solid concentration is less than 4% by solid concentration, then passage of the liquid tends to take a long time, and the productive efficiency deteriorates. Further, the lower the solid concentration becomes, the higher the required concentration rate must be set when performing concentration in later steps. If the solid concentration exceeds 40% by solid concentration, then the viscosity of the liquid becomes overly high, and the chance of lactose crystallization increases.

The flow rate during passage of the liquid is, for example, preferably from 2 to 12 SV, and more preferably from 3 to 8 SV. If the flow rate is less than 2 SV, then passage of the liquid tends to take a long time, and the productive efficiency deteriorates. If the flow rate exceeds 12 SV, then the pressure loss tends to increase. SV represents the relative volume of liquid passing through the resin per unit of time relative to the volume of the ion exchange resin, so that the flow rate at which a volume of liquid equal to the volume of the ion exchange resin passes through the resin in 1 hour is deemed to be 1 SV.

The temperature at which the liquid is passed through the ion exchange resin is preferably within a range from 2 to 50° C., and more preferably from 3 to 15° C. If this temperature is less than 2° C., then the viscosity of the liquid becomes overly high. Further, if the temperature falls too low, then there is also a danger that the liquid may freeze. In contrast, if the temperature exceeds 50° C., then the chance of protein denaturation or browning or the like increases. In order to suppress microbial proliferation, the temperature is preferably not higher than 10° C.

The ion-exchanged whey liquid (eluate) obtained in this manner may be used, with no further modification, as a liquid low-phosphorus whey, or if necessary, may be subjected to one or more post-treatments using conventional methods. These post-treatments are preferably treatments that cause no increase in the phosphorus content within the liquid. Further, the post-treatments preferably also cause no reduction in the calcium content and the magnesium content within the liquid.

For example, the ion-exchanged whey liquid may be concentrated to obtain a concentrated liquid low-phosphorus whey. Further, if necessary, the obtained ion-exchanged whey liquid may be concentrated and then subjected to a drying step such as freeze drying or spray drying to prepare a powdered low-phosphorus whey. The low-phosphorus whey can be used as a raw material for other products.

According to the present embodiment, by passing the low-chloride whey liquid that has undergone demineralization treatment by nanofiltration through an anion exchange resin in chloride form, a low-phosphorus whey having a reduced phosphorus content can be obtained, as illustrated in the examples described below. Further, reductions in the calcium and magnesium content within the raw whey can be suppressed.

The phosphorus content of the final low-phosphorus whey is preferably not more than 12 mmol, and more preferably not more than 10 mmol, per 100 g of solids. Provided this phosphorus content is not more than 12 mmol, it satisfies the ideal level for use within infant formula.

Furthermore, the combined calcium and magnesium content within the low-phosphorus whey is preferably at least 10 mmol per 100 g of solids. Especially, a combined calcium and magnesium content within the low-phosphorus whey within a range from 13 to 17 mmol per 100 g of solids is ideal as a raw material for use within infant formula.

The low-phosphorus whey obtained in the present embodiment has a favorably reduced phosphorus content, while reduction in the calcium and magnesium content contained within the raw whey has been suppressed, and the low-phosphorus whey is therefore particularly ideal for use within infant formula.

Infant formula is a powder prepared either by processing raw milk, cows' milk, certified milk or a foodstuff produced using such milk as a raw material, or by using such a milk or foodstuff as a main raw material, and then adding nutrients required by infants Second Embodiment In this embodiment, a second demineralization treatment is provided for subjecting the ion-exchanged whey liquid (eluate) obtained in the first embodiment to a demineralization treatment by nanofiltration, thereby reducing sodium and potassium content.

<<First Demineralization Step/First Ion Exchange Step>>

In the present embodiment, the first demineralization step and the passage of the whey liquid through the anion exchange resin (referred to as the "first ion exchange step" in this embodiment) are performed in the same manner as the first embodiment.

In the first demineralization step, by subjecting the raw whey liquid to a demineralization treatment using a nanofiltration membrane, the chloride, sodium and potassium and the like contained within the raw whey liquid permeate through the nanofiltration membrane and move to the permeate side. Accordingly, by performing the first demineralization step, a retentate (low-chloride whey liquid) is obtained in which the chloride content within the raw whey liquid has been reduced, while reduction in the calcium and magnesium content has been suppressed, and in which the sodium content and potassium content have also been reduced.

Subsequently, in the first ion exchange step, when the low-chloride whey liquid is passed through the anion exchange resin, the phosphorus content within the liquid is reduced, and the chloride content increases. Accordingly, an eluate (referred to as the "first ion-exchanged whey liquid" in this embodiment) is obtained in which the phosphorus content has been reduced, while reduction in the calcium and magnesium content from the raw whey liquid has been suppressed, and in which the chloride content has increased to a level higher than that of the low-chloride whey liquid. In the present embodiment, the first ion-exchanged whey liquid obtained in this manner is then supplied to the second demineralization step.

<<Second Demineralization Step>>

The nanofiltration membrane and nanofiltration apparatus used in the second demineralization step may be the same as those used in the first demineralization step.

In the second demineralization step, by subjecting the first ion-exchanged whey liquid to a demineralization treatment by nanofiltration, a retentate (hereinafter referred to as the "second demineralized whey liquid") is obtained in which the sodium and potassium content within the first ion-exchanged whey liquid has been reduced, while reduction in the calcium and magnesium content has been suppressed.

In the second demineralization step, the molar ratio of the chloride content relative to the combined sodium and potassium content (chloride/(sodium+potassium)) (hereinafter also referred to as the "Cl/(Na+K) ratio") within the treatment target liquid supplied to the nanofiltration demineralization treatment is preferably at least 0.35. Provided the Cl(Na+K) ratio is at least 0.35, the permeability of sodium and potassium during the nanofiltration (hereinafter also referred to as the "(Na+K) permeability") is satisfactorily high. The Cl/(Na+K) ratio is more preferably 0.5 or greater.

In this description, the (Na+K) permeability is a value represented by formula (1) shown below. The units for the sodium content (hereinafter also referred to as the "Na content") and the potassium content (hereinafter also referred to as the "K content") are mmol/L of liquid.

(Na+K)permeability=(total of Na content and K content within permeate)/(total of Na content and K content within retentate)   (1)

In the present embodiment, if the first ion exchange step is performed in a similar manner to the first embodiment, so that the phosphorus content is reduced to not more than 12 mmol per 100 g of solids, then the Cl/(Na+K) ratio within the obtained first ion-exchanged whey liquid is usually comfortably greater than 0.35, and for example, is typically 0.8 or greater.

Further, in the second demineralization step, in those cases where the nanofiltration is performed using a batch concentration system or a diafiltration system, the (Na+K) permeability decreases and the demineralization efficiency deteriorates as the Cl/(Na+K) ratio within the treatment target liquid reduces. Accordingly, the Cl/(Na+K) ratio within the treatment target liquid is preferably maintained at 0.35 or greater, and more preferably 0.5 or greater, for example by passing the treatment target liquid through an anion exchange resin in chloride form for a second time.

In this case, if the Cl/(Na+K) ratio of the first ion-exchanged whey liquid supplied to the second demineralization step is 0.8 or greater, then the Cl/(Na+K) ratio can be easily maintained at 0.35 or greater until the sodium and potassium content has been reduced to the desired level, even without providing an additional step for increasing the chloride content of the whey liquid.

The upper limit for the Cl/(Na+K) ratio, in the case where the content values for chloride, sodium and potassium have all been reduced within the demineralized whey obtained in the present invention, may be 1.2. In the case where a relatively higher chloride content may be retained in the demineralized whey relative to the sodium and potassium, the upper limit for the Cl/(Na+K) ratio may be 1.5.

<<Second Ion Exchange Step>>

In the second demineralization step, in order to increase the chloride content within the treatment target liquid supplied to the nanofiltration demineralization treatment, a step may be provided for passing the treatment target liquid through an anion exchange resin in chloride form (referred to as the "second ion exchange step" in this embodiment) prior to supplying the treatment target liquid to the demineralization treatment. This second ion exchange step can increase the chloride content while suppressing reduction in the calcium and magnesium content, and if the chloride content is not more than 30 mmol per 100 g of solids, then a further reduction in the phosphorus content due to ion exchange can also be anticipated.

For example, in the second demineralization step, following passage of the retentate, obtained by supplying the first ion-exchanged whey liquid to a demineralization treatment by nanofiltration, through an anion exchange resin in chloride form (the second ion exchange step), the whey liquid may be supplied to a second demineralization treatment by nanofiltration. The above-mentioned passage through an anion exchange resin in chloride form (the second ion exchange step) and the demineralization treatment by nanofiltration may be repeated alternately a plurality of times, with a final demineralization treatment by nanofiltration then being performed.

Moreover, in those cases where the demineralization treatment is performed using a nanofiltration method employing a batch concentration system, an operation for extracting the whey liquid from the raw material tank, passing the whey liquid through an anion exchange resin in chloride form, and then returning the resulting liquid to the raw material tank may also be added.

Furthermore, in those cases where the Cl/(Na+K) ratio decreases during a demineralization treatment by nanofiltration, the Cl/(Na+K) ratio can be increased by passing the treatment target liquid through an anion exchange resin in chloride form, as described above.

The conditions under which the treatment target liquid is passed through the anion exchange resin in chloride form during the second ion exchange step may be set in accordance with the target value for the chloride content within the eluate, provided the conditions do not cause lactose crystallization. As described above, the smaller the value for the solid ratio to resin volume=(amount of solids within the eluate)/(volume of the ion exchange resin), or in other words, the smaller the whey solid content flow volume per unit of exchange capacity of the ion exchange resin, the greater the ion exchange efficiency becomes, and the greater the increase in the chloride content as a result of passage through the ion exchange resin. Accordingly, in order to achieve a greater increase in the chloride content within the eluate, the solid concentration of the liquid passed through the resin is preferably lowered, and the flow rate is preferably reduced (slowed).

Examples of preferred conditions for passage of the liquid through the anion exchange resin in the second ion exchange step are the same as those described for the first ion exchange step.

The retentate (second demineralized whey liquid) obtained following the final nanofiltration may be used, with no further modification, as a liquid demineralized low-phosphorus whey. Further, if required, the second demineralized whey liquid may be concentrated, or subjected to drying by a conventional method to prepare a powdered demineralized low-phosphorus whey. However, it is thought that the low-phosphorus whey of the present invention tends to be more prone to precipitation upon heating than conventional whey, and therefore in those cases where it is desirable to suppress precipitation, a suitable technique such as lowering the heating temperature, shortening the heating time or lowering the solid content concentration during heating may be employed.

According to the present embodiment, by subjecting the ion-exchanged whey liquid obtained in the first embodiment to an additional demineralization treatment by nanofiltration, a low-phosphorus whey can be obtained in which the phosphorus, sodium and potassium content within the raw whey is reduced, while reduction in the calcium and magnesium content is suppressed.

In the present embodiment, the combined sodium and potassium content within the finally obtained demineralized low-phosphorus whey is preferably not more than 40 mmol, and more preferably not more than 32 mmol, per 100 g of solids.

As was described for the first embodiment, the phosphorus content is preferably not more than 12 mmol, and more preferably not more than 10 mmol, per 100 g of solids.

Further, as was described for the first embodiment, the combined total of the calcium content (hereinafter also referred to as the "Ca content") and the magnesium content (hereinafter also referred to as the "Mg content") is preferably at least 10 mmol per 100 g of solids. A combined total of the calcium content and the magnesium content within a range from 13 to 17 mmol per 100 g of solids is ideal as a raw material for use within infant formula.

EXAMPLES

A more detailed description of the present invention is presented below using a series of examples, but the present invention is in no way limited by these examples. In the following description, unless stated otherwise, the units "%" used to described content values refer to "% by mass."

Example 1

First Demineralization Step

Water was added to dissolve 5 kg of a cheese whey powder (protein: 13.0%, fat: 1.0%, carbohydrates: 76.2%, ash: 7.8%, moisture: 2.0%, phosphorus: 19 mmol/100 g), thus yielding 55 kg of a raw whey liquid (pH=6.8).

The thus prepared raw whey liquid was passed through a nanofiltration membrane (DL3840C-30D, manufactured by GE Water & Process Technologies, Inc.) and subjected to a demineralization treatment using a diafiltration system. In other words, a diafiltration system, in which the retentate was returned to the raw liquid tank while a volume of water equivalent to the volume of permeate was added to the raw liquid tank, thereby maintaining the liquid volume in the raw liquid tank at a constant level, was used to perform a batch demineralization treatment until the weight of permeate reached 50 kg. The thus obtained liquid inside the raw liquid tank at this point was a low-chloride whey liquid. The collected weight of this low-chloride whey liquid was 64.0 kg, which included a solid content of 4.4 kg.

Ion Exchange Step

Subsequently, 64 kg of the thus obtained low-chloride whey liquid having a solid concentration of approximately 6.9% was passed through a column packed with 4 L of an anion exchange resin in chloride form (IRA402BL, manufactured by Rohm and Haas Company) at a flow rate of 6 SV and a liquid temperature of 5 to 10° C., thus yielding 71.2 kg of an ion-exchanged whey liquid (eluate) having a solid concentration of 6.0%. In this example, the ion-exchanged whey liquid is a liquid low-phosphorus whey.

For each of the raw whey liquid, the low-chloride whey liquid and the ion-exchanged whey liquid, the pH, the combined total of the sodium (Na) content and the potassium (K) content per 100 g of solids (listed as Na+K in the table), the combined total of the Ca content and the Mg content per 100 g of solids (listed as Ca+Mg in the table), the phosphorus content (listed as P in the table), and the chloride content (listed as Cl in the table) are shown in Table 1. The units for mineral content are mmol/100 g of solids (this also applies below).

TABLE 1

| | Units: mmol per 100 g of solids | | | | |
|---|---|---|---|---|---|
| | pH | Na + K | Ca + Mg | P | Cl |
| Raw whey liquid | 6.8 | 93.2 | 16.9 | 19.3 | 46.3 |
| Low-chloride whey liquid | 6.8 | 67.2 | 18.9 | 19.5 | 15.6 |
| Ion-exchanged whey liquid (low-phosphorus whey liquid) | 6.6 | 67.9 | 15.6 | 10.8 | 72.0 |

As illustrated in Table 1, the pH for the raw whey liquid, the low-chloride whey liquid and the ion-exchanged whey liquid was substantially unchanged, with all the pH values being within a range from 6.6 to 6.8.

Compared with the raw whey liquid, the ion-exchanged whey liquid exhibited a satisfactory reduction in the phosphorus content, with minimal reduction in the calcium and magnesium content.

Example 2

Sufficient water was added to the 71.2 kg of the ion-exchanged whey liquid obtained in Example 1 (solid concentration: 6.0%, pH=6.6) to increase the mass to 78.7 kg. Calculation of the Cl/(Na+K) ratio within the ion-exchanged whey liquid based on the values in Table 1 yields a result of 1.06. In this example, the ion-exchanged whey liquid was used as the treatment target liquid initially supplied to the demineralization treatment of a second demineralization step.

Second Demineralization Step

The ion-exchanged whey liquid was subjected to a demineralization treatment using the same nanofiltration apparatus as that described for the first demineralization step of Example 1. In other words, a demineralization treatment was performed, using a batch concentration system in which the retentate was returned to the raw liquid tank, until the weight of permeate reached 50 kg, and then the nanofiltration demineralization treatment was continued using a diafiltration system until the weight of the permeate reached 13 kg (namely, a total weight of permeate of 63 kg from the start of the demineralization treatment). The thus obtained liquid inside the raw liquid tank was deemed a second demineralized whey liquid (demineralized low-phosphorus whey liquid). The collected weight of this second demineralized whey liquid was 24.8 kg, the solid concentration was 14.7%, and the pH was 6.4.

The composition per 100 g of solids of the obtained second demineralized whey liquid (demineralized low-phosphorus whey liquid) is shown in Table 2.

TABLE 2

| Units: g per 100 g of solids | | | | Units: mmol per 100 g of solids | | | |
| --- | --- | --- | --- | --- | --- | --- | --- |
| Fat | Protein | Carbohydrate | Ash | Na + K | Ca + Mg | P | Cl |
| 1.0 | 12.7 | 83.7 | 2.5 | 18.7 | 14.4 | 10.8 | 18.4 |

As illustrated in Table 2, a low-phosphorus whey was obtained which contained satisfactorily reduced values for the phosphorus, sodium and potassium content. Further, compared with the raw whey liquid, the reduction in the calcium and magnesium content was minimal.

Calculation of the Cl/(Na+K) ratio within the second demineralized whey liquid based on the values in Table 2 yields a result of 0.98. In this example, because the second demineralized whey liquid is the liquid obtained following demineralization of the final treatment target liquid supplied to the nanofiltration demineralization treatment, the Cl/(Na+K) ratio cannot be greater than that of the final treatment target liquid supplied to the nanofiltration demineralization treatment. Accordingly, because the Cl/(Na+K) ratio of the treatment target liquid initially supplied to the demineralization treatment of the second demineralization step (namely, the ion-exchanged whey liquid) was 1.06, and the Cl/(Na+K) ratio of the final treatment target liquid supplied to the demineralization treatment must be at least 0.98, it is evident that the Cl/(Na+K) ratio of the treatment target liquid was able to be maintained at a level that was comfortably higher than 0.35.

Example 3

First Demineralization Step

Water was added to dissolve 8 kg of a cheese whey powder that had been pretreated (demineralized) by nanofiltration (protein: 12.4%, fat: 1.1%, carbohydrates: 77.1%, ash: 5.6%, moisture: 3.8%, phosphorus: 19 mmol/100 g), thus yielding 87 kg of a raw whey liquid.

Using the same nanofiltration membrane as that described for Example 1, a batch demineralization treatment was performed using a diafiltration system until the weight of permeate reached 24 kg. The thus obtained liquid inside the raw liquid tank was deemed a low-chloride whey liquid.

Ion Exchange Step

Subsequently, from the 87 kg of obtained low-chloride whey liquid, 66.7 kg (solids: 6 kg) was extracted. Sufficient water was added to the extracted sample to obtain 75.1 kg of a liquid having a solid concentration of approximately 8%, and this 75.1 kg of liquid was passed through a column packed with 6 L of the same anion exchange resin in chloride form as that used in Example 1, at a flow rate of 6 SV and a liquid temperature of 5 to 10° C., thus yielding 76.1 kg of an ion-exchanged whey liquid (eluate) having a solid concentration of 7.4%. In this example, the ion-exchanged whey liquid is a liquid low-phosphorus whey.

For each of the raw whey liquid, the low-chloride whey liquid and the ion-exchanged whey liquid, the pH, the combined total of the Na content and the K content per 100 g of solids, the combined total of the Ca content and the Mg content per 100 g of solids, the phosphorus content, and the chloride content are shown in Table 3.

TABLE 3

| | | Units: mmol per 100 g of solids | | | |
| --- | --- | --- | --- | --- | --- |
| | pH | Na + K | Ca + Mg | P | Cl |
| Raw whey liquid | 6.4 | 60.0 | 19.5 | 19.7 | 17.3 |
| Low-chloride whey liquid | 6.4 | 53.6 | 19.8 | 19.2 | 11.6 |
| Ion-exchanged whey liquid (low-phosphorus whey liquid) | 6.1 | 55.0 | 16.3 | 9.5 | 67.5 |

As illustrated in Table 3, the pH for the raw whey liquid, the low-chloride whey liquid and the ion-exchanged whey liquid was substantially unchanged, with all the pH values being within a range from 6.1 to 6.4. Compared with the raw whey liquid, the ion-exchanged whey liquid exhibited a satisfactory reduction in the phosphorus content, with minimal reduction in the calcium and magnesium content.

Example 4

Sufficient water was added to the 76.1 kg of the ion-exchanged whey liquid obtained in Example 3 (solid concentration: 7.4%, pH=6.1) to increase the mass to 83.2 kg. Calculation of the Cl/(Na+K) ratio within the ion-exchanged whey liquid based on the values in Table 3 yields a result of 1.23. In this example, the ion-exchanged whey liquid was used as the treatment target liquid initially supplied to the demineralization treatment of a second demineralization step.

Second Demineralization Step

The ion-exchanged whey liquid was subjected to a demineralization treatment using the same nanofiltration apparatus as that described for the first demineralization step of Example 3. In other words, a demineralization treatment was performed, using a batch concentration system, until the weight of permeate reached 45 kg. Subsequently, the nanofiltration demineralization treatment was continued using a diafiltration system until the weight of the permeate reached 25 kg (namely, a total mass of permeate of 70 kg from the start of the demineralization treatment). The thus obtained liquid inside the raw liquid tank was deemed a second demineralized whey liquid (demineralized low-phosphorus whey liquid). The collected weight of this second demineralized whey liquid was 30 kg, the solid concentration was 14.0%, and the pH was 6.2.

The composition per 100 g of solids of the obtained second demineralized whey liquid (demineralized low-phosphorus whey liquid) is shown in Table 4.

TABLE 4

| Units: g per 100 g of solids | | | | Units: mmol per 100 g of solids | | | |
|---|---|---|---|---|---|---|---|
| Fat | Protein | Carbohydrate | Ash | Na + K | Ca + Mg | P | Cl |
| 1.2 | 12.5 | 84.3 | 2.0 | 13.9 | 11.0 | 8.9 | 16.3 |

As illustrated in Table 4, a low-phosphorus whey was obtained which contained satisfactorily reduced values for the phosphorus, sodium and potassium content. Further, compared with the raw whey liquid, the reduction in the calcium and magnesium content was minimal.

Calculation of the Cl/(Na+K) ratio within the second demineralized whey liquid based on the values in Table 4 yields a result of 1.17. In this example, because the second demineralized whey liquid is the liquid obtained following demineralization of the final treatment target liquid supplied to the nanofiltration demineralization treatment, the Cl/(Na+K) ratio of the final treatment target liquid supplied to the nanofiltration demineralization treatment must be at least 1.17. In other words, it is evident that the Cl/(Na+K) ratio of the treatment target liquid was able to be maintained at a level that was comfortably higher than 0.35.

Comparative Example 1

In this example, only the demineralization treatment using a nanofiltration method was performed, so that the step of passing the liquid through an ion exchange resin was not performed. The demineralization treatment was performed so that the permeate volume was greater than that obtained in the first demineralization treatment of Example 1.

In other words, water was added to dissolve 5.6 kg of a cheese whey powder (protein: 12.6%, fat: 1.0%, carbohydrates: 76.8%, ash: 8.08%, moisture: 1.6%, phosphorus: 18.3 mmol/100 g), thus yielding 100 kg of a raw whey liquid (pH=6.9).

The thus prepared raw whey liquid was subjected to a batch demineralization treatment using the same nanofiltration membrane as that described in Example 1 until the weight of permeate reached 50 kg.

Subsequently, the demineralization treatment was continued by performing three repetitions of a nanofiltration step in which 50 kg of water was added to the retentate and the demineralization was performed until a further 50 kg of permeate had been obtained. The thus obtained liquid inside the raw liquid tank was a demineralized whey liquid (comparative example).

For the raw whey liquid and the demineralized whey liquid (comparative example), the combined total of the Na content and the K content per 100 g of solids, the combined total of the Ca content and the Mg content per 100 g of solids, the phosphorus content, and the chloride content are shown in Table 5.

TABLE 5

| | Units: mmol per 100 g of solids | | | |
|---|---|---|---|---|
| | Na + K | Ca + Mg | P | Cl |
| Raw whey liquid | 93.2 | 16.6 | 18.6 | 47.9 |
| Demineralized whey liquid (comparative example) | 49.5 | 18.5 | 18.2 | 1.8 |

In this example, the demineralization treatment by nanofiltration was continued until a much greater weight of permeate had been obtained than in Example 1, but there was almost no reduction in the phosphorus content. The combined total of the Na content and the K content within the obtained liquid was greater than the target value of 40 mmol/100 g, and the phosphorus content was greater than 12 mmol/100 g.

Comparative Example 2

In this example, the demineralization treatment by nanofiltration was not performed prior to passage of the raw whey liquid through the anion exchange resin, but was rather performed after passage through the anion exchange resin.

In other words, water was added to dissolve 6.6 kg of a cheese whey powder (protein: 13.2%, fat: 0.9%, carbohydrates: 76%, ash: 7.9%, moisture: 2.1%, phosphorus: 21.2 mmol/100 g, chloride: 42.6 mmol/100 g), thus yielding 93 kg of a raw whey liquid (pH=6.8).

The thus prepared raw whey liquid was passed through a column packed with 5 L of the same anion exchange resin in chloride form as that used in Example 1, yielding 99.2 kg (solids: 6.3 kg) of an eluate (ion-exchanged whey liquid). Sufficient water was added to this eluate to increase the weight to 108 kg, and a demineralization treatment was performed by supplying the liquid to the same nanofiltration apparatus as that used in Example 1.

The conditions during passage of the raw whey liquid through the anion exchange resin in chloride form included a flow rate of 6 SV and a liquid temperature of 5 to 10° C. The pH of the eluate (ion-exchanged whey liquid) was 6.5.

The demineralization treatment by nanofiltration was performed using a batch concentration system in which the retentate was returned to the raw liquid tank, and was performed until the mass of retentate reached 68.6 kg. The liquid within the raw liquid tank at this point was deemed a demineralized whey liquid (I). The total weight of the demineralized whey liquid (I) was 39 kg, the solid concentration was 15.6%, and the pH was 6.3.

Subsequently, the batch nanofiltration was continued using a diafiltration system, and demineralization was performed until the weight of permeate reached 39.0 kg. The thus obtained liquid within the raw liquid tank was deemed a demineralized whey liquid (II). The pH of the demineralized whey liquid (II) was 6.3.

For each of the raw whey liquid, the eluate (ion-exchanged whey liquid) and the demineralized whey liquid (II), the combined total of the Na content and the K content per 100 g of solids, the combined total of the Ca content and the Mg content per 100 g of solids, the phosphorus content, and the chloride content are shown in Table 6.

TABLE 6

| | Units: mmol per 100 g of solids | | | |
|---|---|---|---|---|
| | Na + K | Ca + Mg | P | Cl |
| Raw whey liquid | 98.2 | 17.6 | 21.7 | 43.5 |
| Ion-exchanged whey liquid | 97.1 | 15.4 | 19.0 | 92.1 |
| Demineralized whey liquid (II) | 23.4 | 15.6 | 19.4 | 13.1 |

In this example, because no preliminary demineralization treatment by nanofiltration was performed, and the raw whey liquid containing 43.5 mmol of chloride per 100 g of solids was simply passed through the anion exchange resin in chloride form, the phosphorus content within the eluate (ion-exchanged whey liquid) exhibited almost no reduction compared with the raw whey liquid.

Test Example 1

In this example, the relationship between the amount of chloride reduction in the first demineralization step, and the amount of phosphorus reduction when the resulting demineralized liquid was passed through the ion exchange resin was investigated.

First Demineralization Step

Water was added to dissolve 10.5 kg of a cheese whey powder (protein: 13.1%, fat: 0.8%, carbohydrates: 76.2%, ash: 7.9%, moisture: 2.0%, combined total of sodium and potassium: 94.5 mmol/100 g, combined total of calcium and magnesium: 17.5 mmol/100 g, phosphorus: 21.7 mmol/100 g, chloride: 43.2 mmol/100 g), thus yielding 115 kg of a raw whey liquid (pH=6.7).

Subsequently, with the purpose of reducing the chloride concentration within the obtained raw whey liquid, a demineralization treatment was performed using the same nanofiltration membrane as that described for Example 1, by using a diafiltration system in which the retentate was returned to the raw liquid tank while a volume of water equivalent to the volume of permeate was added to the raw liquid tank. During this demineralization treatment, four 10 kg sample liquids were extracted periodically from the retentate (low-chloride whey liquid). Including the raw whey liquid, the pH of all five sample liquids (sample numbers 1 to 5) was 6.8. The mineral composition of each sample liquid is shown in Table 7.

Ion Exchange Step

Approximately 2 kg of each of the obtained sample liquids was freeze dried, yielding a series of sample powders. Water was added to dissolve 22.5 g of each sample powder, thus preparing aqueous solutions having a solid concentration of 7%. Each aqueous solution was passed through a column packed with 15 ml of the same anion exchange resin in chloride form as that used in Example 1, at a flow rate of 5 to 6 SV and a liquid temperature of 5 to 10° C., a predetermined volume of the eluate was collected from the start of outflow from the column (a first collection), and a predetermined volume of the subsequent eluate was also collected (a second collection). The collected volume of liquid was a volume equivalent to approximately 10 g of solids in the case of the first collection (solid ratio to resin volume: 0 to 0.67), and a volume equivalent to approximately 12.5 g of solids in the second collection (solid ratio to resin volume: 0.67 to 1.5). In this manner, an eluate of the solid ratio to resin volume from 0 to 0.67, and an eluate of the solid ratio to resin volume from 0.67 to 1.5 were obtained for each of the sample liquids of sample numbers 1 to 5, yielding a total of 10 ion-exchanged whey liquid samples. The pH of all these samples was 6.6.

The mineral composition of each of these ion-exchanged whey liquid samples is shown in Table 8. In the table, the composition of the eluate of the solid ratio to resin volume from 0 to 0.67 (0 to 0.67 solid ratio to resin volume eluate) simply shows the analysis values, whereas the composition of the eluate of the solid ratio to resin volume from 0 to 1.5 (0 to 1.5 solid ratio to resin volume eluate) shows the weighted average value of the analysis value for the 0 to 0.67 solid ratio to resin volume eluate and the analysis value for the 0.67 to 1.5 solid ratio to resin volume eluate. The units for the mineral content values are mmol/100 g of solids.

Figure 1:
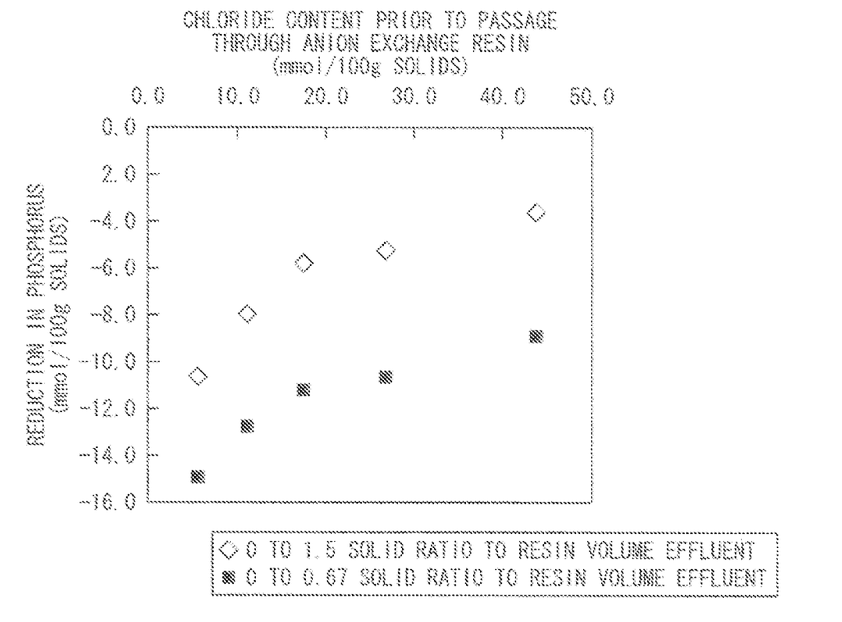
FIG. 1 is a graph illustrating the relationship, for a series of test examples, between the reduction in phosphorus by passage through an anion exchange resin in chloride form, and the chloride content prior to passage through the anion exchange resin.

FIG. 1 is a graph illustrating the relationship between the reduction in phosphorus, calculated as the difference between the phosphorus content in the liquid (eluate) following passage through the anion exchange resin in chloride form and the phosphorus content in the sample (low-chloride whey liquid) prior to passage through the anion exchange resin, and the chloride content in the sample (low-chloride whey liquid) prior to passage through the anion exchange resin, wherein the horizontal axis represents the chloride content prior to passage through the anion exchange resin (units: mmol/100 g solids), and the vertical axis represents the reduction in phosphorus (units: mmol/100 g solids).

TABLE 7

| | Units: mmol per 100 g of solids | | | |
|---|---|---|---|---|
| Sample number | Na + K | Ca + Mg | P | Cl |
| 1 (Raw whey liquid) | 96.4 | 17.8 | 22.2 | 44.0 |
| 2 (Low-chloride whey liquid) | 79.6 | 18.5 | 22.1 | 27.0 |
| 3 (Low-chloride whey liquid) | 71.5 | 18.7 | 22.0 | 17.3 |
| 4 (Low-chloride whey liquid) | 66.7 | 19.3 | 22.4 | 11.4 |
| 5 (Low-chloride whey liquid) | 60.1 | 19.5 | 22.3 | 5.7 |

TABLE 8

| | 0 to 0.67 solid ratio to resin volume eluate | | | | 0 to 1.5 solid ratio to resin volume eluate | | | |
|---|---|---|---|---|---|---|---|---|
| Sample number | Na + K | Ca + Mg | P | Cl | Na + K | Ca + Mg | P | Cl |
| 1 | 100.2 | 14.7 | 13.3 | 105.0 | 100.4 | 14.1 | 18.6 | 93.0 |
| 2 | 87.4 | 15.5 | 11.4 | 79.9 | 85.1 | 14.6 | 16.8 | 74.1 |
| 3 | 75.5 | 16.0 | 10.8 | 84.0 | 75.2 | 15.0 | 16.3 | 72.0 |
| 4 | 70.2 | 16.1 | 9.6 | 82.6 | 69.3 | 15.3 | 14.5 | 68.5 |
| 5 | 63.4 | 16.5 | 7.4 | 79.8 | 63.4 | 15.7 | 11.7 | 66.6 |

Based on the results in Tables 7 and 8 and FIG. 1, comparing the 0 to 0.67 solid ratio to resin volume eluate and the 0 to 1.5 solid ratio to resin volume eluate reveals that the 0 to 0.67 solid ratio to resin volume eluate exhibits a greater reduction in the phosphorus content and a greater increase in the chloride content following ion exchange. In other words, the ion exchange efficiency is superior for smaller solid ratio to resin volumes.

When a raw whey having a chloride content of 44 mmol/100 g solids (sample 1) was passed through the anion exchange resin, the 0 to 1.5 solid ratio to resin volume eluate showed almost no reduction in phosphorus, and even in the 0 to 0.67 solid ratio to resin volume eluate, the phosphorus content was unable to be reduced to a level of not more than 12 mmol/100 g.

When the chloride content of the liquid (low-chloride whey liquid) for passage through the anion exchange resin in chloride form was not more than 30 mmol/100 g of solids (sample 2), the reduction in phosphorus content increased, and for the 0 to 0.67 solid ratio to resin volume eluate, a phosphorus content of not more than 12 mmol/100 g was able to be achieved.

When the chloride content of the liquid (low-chloride whey liquid) for passage through the anion exchange resin in chloride form was not more than 20 mmol/100 g of solids (samples 3 to 5), the reduction in phosphorus content increased markedly, and the lower the chloride content, the greater the reduction in the phosphorus content.

INDUSTRIAL APPLICABILITY

The present invention enables the manufacture of a low-phosphorus whey in which the phosphorus content within the whey is reduced, while reduction in the calcium and magnesium content is suppressed.

Moreover, by providing the above-mentioned second demineralization step, a low-phosphorus whey can be manufactured in which the phosphorus, sodium and potassium content within the whey is reduced, while reduction in the calcium and magnesium content is suppressed, and therefore the present invention is useful within the field of foodstuffs.

The invention claimed is:

1. A method of manufacturing a whey in which a phosphorus content is not more than 12 mmol per 100 g of solids, and a combined total of a calcium content and a magnesium content is at least 10 mmol per 100 g of solids, the method comprising, in the following sequential order:
    via a first nanofiltration method, filtering monovalent minerals including chloride from a raw whey liquid thereby obtaining a low-chloride whey liquid as a retentate in which a chloride content has been reduced to not more than 30 mmol per 100 g of solids,
    reducing the phosphorus content and increasing the chloride content of the low-chloride whey liquid by passing the low-chloride whey liquid through an anion exchange resin in chloride form thereby obtaining an ion-exchanged whey liquid in which a phosphorus content is not more than 12 mmol per 100 g of solids and a molar ratio of a chloride content relative to a combined total of a sodium content and a potassium content (chloride/(sodium+potassium)) is 0.35 or greater, and
    via a second nanofiltration method, filtering chloride, sodium, and potassium from the ion-exchanged whey liquid thereby obtaining a whey liquid as a retentate in which the molar ratio is maintained at a value of 0.35 or greater, the phosphorus content is not more than 12 mmol per 100 g of solids, and a combined total of a calcium content and a magnesium content is at least 10 mmol per 100 g of solids in the whey liquid.

2. The method of manufacturing a whey according to claim 1, wherein a pH of the raw whey liquid is within a range from 6 to 7, and a pH of the low-chloride whey liquid and a pH of the ion-exchanged whey liquid from the anion exchange resin are both within a range from 6 to 7.

3. The method of manufacturing a whey according to claim 1, wherein a chloride content of the low-chloride whey liquid is not more than 20 mmol per 100 g of solids.

4. A method of manufacturing a whey in which a phosphorus content is not more than 12 mmol per 100 g of solids, and a combined total of a calcium content and a magnesium content is at least 10 mmol per 100 g of solids, the method comprising, in the following sequential order:
    reducing the phosphorus content and increasing the chloride content of a low-chloride whey liquid by passing the low-chloride whey liquid whose pH is within a range from 6 to 7, which comprises a whey and has a chloride content of not more than 30 mmol per 100 g of solids, through an anion exchange resin in chloride form thereby obtaining an ion-exchanged whey liquid whose pH is within a range from 6 to 7 and in which a phosphorus content is not more than 12 mmol per 100 g of solids and a molar ratio of a chloride content relative to a combined total of a sodium content and a potassium content (chloride/(sodium+potassium)) is 0.35 or greater, and
    via a nanofiltration method, filtering chloride, sodium, and potassium from the ion-exchanged whey liquid thereby obtaining a whey liquid as a retenate in which the, a molar ratio is maintained at a value of 0.35 or greater, the phosphorus content is not more than 12 mmol per 100 g of solids, and a combined total of a calcium content and a magnesium content is at least 10 mmol per 100 g of solids in the whey liquid.

5. The method of manufacturing a whey according to claim 4, wherein a chloride content of the low-chloride whey liquid is not more than 20 mmol per 100 g of solids.

6. The method of manufacturing a whey according to claim 1, wherein the whey is used for preparing an infant formula.

7. The method of manufacturing a whey according to claim 4, wherein the whey is used for preparing an infant formula.

* * * * *